US008743193B2

(12) United States Patent
Bogner

(10) Patent No.: US 8,743,193 B2
(45) Date of Patent: Jun. 3, 2014

(54) METHOD AND DEVICE FOR DETECTING DROWSINESS

(75) Inventor: Nico Bogner, Hankensbuttel (DE)

(73) Assignee: Volkswagen AG, Wolfsburg (DE)

( * ) Notice: Subject to any disclaimer, the term of this patent is extended or adjusted under 35 U.S.C. 154(b) by 11 days.

(21) Appl. No.: 13/604,461

(22) Filed: Sep. 5, 2012

(65) Prior Publication Data

US 2013/0162797 A1 Jun. 27, 2013

Related U.S. Application Data

(60) Provisional application No. 61/579,209, filed on Dec. 22, 2011, provisional application No. 61/663,096, filed on Jun. 22, 2012.

(51) Int. Cl.
*H04N 7/18* (2006.01)

(52) U.S. Cl.
USPC ............... 348/78; 348/77; 348/148; 348/143; 348/155

(58) Field of Classification Search
USPC .............................. 348/78, 77, 148, 143, 155
See application file for complete search history.

(56) References Cited

U.S. PATENT DOCUMENTS

| | | | | |
|---|---|---|---|---|
| 5,801,763 | A * | 9/1998 | Suzuki | 348/77 |
| 6,825,469 | B2 * | 11/2004 | Yamaguchi et al. | 250/330 |
| 7,363,135 | B2 * | 4/2008 | Lin et al. | 701/42 |
| 7,722,236 | B2 * | 5/2010 | Naganawa et al. | 362/543 |
| 2009/0287368 | A1 * | 11/2009 | Bonne | 701/29 |
| 2009/0322506 | A1 * | 12/2009 | Schmitz | 340/439 |
| 2010/0039249 | A1 | 2/2010 | Schmitz et al. | |

FOREIGN PATENT DOCUMENTS

| | | | |
|---|---|---|---|
| DE | 103 47 977 | | 5/2005 |
| DE | 10 2005 031 311 | | 1/2007 |
| DE | 102005031311 | A1 * | 1/2007 |
| DE | 10 2005 057 267 | | 6/2007 |
| DE | 10 2009 004 487 | | 7/2010 |
| DE | 102009004487 | A1 * | 7/2010 |
| EP | 0 911 231 | | 4/1999 |
| WO | 2008/052827 | | 5/2008 |

* cited by examiner

*Primary Examiner* — Shawn An
(74) *Attorney, Agent, or Firm* — Kenyon & Kenyon LLP

(57) ABSTRACT

In a method and a device for detecting the drowsiness of a driver in a motor vehicle, a drowsiness model is provided to determine a value characterizing the drowsiness of the driver as a function of at least one output quantity of a driver-activity sensor array. Moreover, the device for detecting drowsiness includes a brightness sensor as well as a correction model for correcting the value characterizing the drowsiness of the driver as a function of at least one output quantity of the brightness sensor.

26 Claims, 3 Drawing Sheets

METHOD AND DEVICE FOR DETECTING DROWSINESS

CROSS-REFERENCE TO RELATED APPLICATIONS

The present application claims the benefit of U.S. Provisional Patent Application No. 61/579,209, filed on Dec. 22, 2011, and 61/663,096, filed on Jun. 22, 2012, each of which is expressly incorporated herein in its entirety by reference thereto.

The present application expressly incorporates herein in its entirety by reference thereto U.S. patent application Ser. No. 13/483,278, filed on May 30, 2012.

FIELD OF THE INVENTION

The present invention relates to a method and a device for detecting drowsiness.

BACKGROUND INFORMATION

German Published Patent Application No. 10 2009 004 487 describes a method for detecting the drowsiness of a driver, in which a measure for the severity of the inattentiveness and/or drowsiness of the driver is calculated from sensory data, the measure for the severity of the inattentiveness and/or drowsiness being ascertained based on data from a steering wheel angle sensor as a function of a steering rest phase and a subsequent steering action, a steering error being determined, and each steering error being linked to an assigned weighting factor.

German Published Patent Application No. 10 2005 057 267 and U.S. Patent Application Publication No. 2010/0039249, each of which is expressly incorporated herein in its entirety by reference thereto, describe a method for detecting the state of a driver, a signal signaling the state of the driver being generated as a function of the steering angle, the time characteristic of the steering angle being determined, and a signal representing the driver state as inattentive being generated at least in response to the presence of a typical time characteristic of the steering angle.

PCT International Published Patent Application No. WO 2008/052827 describes a method and a device for detecting the state of a driver, in which a signal characterizing the driver state is derived from the rate of occurrence of the minima in the time characteristic of a quantity which represents the lane-keeping behavior of the driver, in particular, the time which is necessary until the crossing of the lane marking.

German Published Patent Application No. 10 2005 031 311 describes a drowsiness warning system for drivers, having a detection device for the instantaneous detection of the driver drowsiness, having an evaluator, connected to the detection device, for determining an instantaneous drowsiness value, and having a warning device for warning the driver in the event the drowsiness value exceeds a threshold value determined in the evaluator, a device being provided for adapting the threshold in consideration of a drowsiness model of the driver, and the drowsiness model taking sleep information about the driver into account.

SUMMARY

Example embodiments of the present invention provide an especially robust drowsiness detection. It is especially desirable that the drowsiness detection is accomplished independently of groups of people.

According to example embodiments of the present invention, a device for detecting the drowsiness of a driver in a motor vehicle includes: a driver-activity sensor array, particularly for determining at least one value characterizing an activity of the driver in the motor vehicle; a brightness sensor for determining the brightness in the motor-vehicle surroundings; a drowsiness model for determining a value characterizing the drowsiness of the driver in the motor vehicle as a function of at least one output quantity of the driver-activity sensor array; and a correction module for correcting the value characterizing the drowsiness of the driver in the motor vehicle as a function of at least one output quantity of the brightness sensor.

For example, to correct the value characterizing the drowsiness of the driver in the motor vehicle, the corresponding drowsiness model may be weighted or the value characterizing the drowsiness of the driver in the motor vehicle may be multiplied by a correction value. It may also be provided to add or subtract a suitable correction value. The value characterizing the drowsiness of the driver in the motor vehicle may also be corrected to the effect that evaluation threshold values such as limiting values, for example, as of which drowsiness is assumed are shifted as a function of the output quantity of the brightness sensor.

Possible drowsiness models are described, for example, in U.S. Patent Application Publication No. 2010/0039249, PCT International Published Patent Application No. WO 2008/052827, and German Published Patent Application No. 10 2009 004 487, each of which is expressly incorporated herein in its entirety by reference thereto.

Brightness is, for example, a measure for the perceived intensity or strength of the visible light. Brightness may be the luminous intensity, a quantity having the unit candela, the light intensity, the luminance, the radiant flux, etc. A brightness sensor may include a rain sensor, a sensor used as a rain sensor, a light-sensitive element (e.g., a photodiode) of a rain sensor. Rain sensors are described, for example, in European Published Patent Application No. 0 911 231 and German Published Patent Application No. 103 47 977, each of which is expressly incorporated herein in its entirety by reference thereto.

The driver-activity sensor array may include a steering-angle sensor, a camera picking up a roadway in front of the motor vehicle, etc. For example, such a camera may be situated behind the motor-vehicle windshield in its upper area. The driver-activity sensor array may include an acceleration sensor for detecting the acceleration of the motor vehicle and/or a speed sensor for detecting the speed of the motor vehicle.

The device for detecting drowsiness may include a unit for detecting an eyelid movement of the driver.

The value characterizing the drowsiness of the driver in the motor vehicle may be independent of a circadian value and/or may be independent of the time of day.

According to example embodiments of the present invention, a device for detecting the drowsiness of a driver in a motor vehicle includes: a driver-activity sensor array, particularly for determining at least one value characterizing an activity of the driver in the motor vehicle; a brightness sensor for determining the brightness in the motor-vehicle surroundings; and a drowsiness-detection module for determining a value characterizing the drowsiness of the driver in the motor vehicle as a function of at least one output quantity of the driver-activity sensor array and as a function of at least one output quantity of the brightness sensor.

The driver-activity sensor array may include a steering-angle sensor, a camera picking up a roadway in front of the motor vehicle, an acceleration sensor for detecting the acceleration of the motor vehicle, a speed sensor for detecting the speed of the motor vehicle, etc.

The device for detecting drowsiness may include a unit for detecting an eyelid movement of the driver.

The value characterizing the drowsiness of the driver in the motor vehicle may be independent of a circadian value and/or may be independent of the time of day.

According to example embodiments of the present invention, a method for detecting the drowsiness of a driver in a motor vehicle, includes determining at least one value characterizing an activity of the driver, determining brightness in a passenger compartment of the motor vehicle, determining a value characterizing the drowsiness of the driver in the motor vehicle as a function of the value characterizing the activity of the driver, and correcting the value characterizing the drowsiness of the driver in the motor vehicle as a function of the brightness in the passenger compartment of the motor vehicle.

The value characterizing the activity of the driver may include or may be the steering behavior of the driver. The determination of the value characterizing the drowsiness of the driver in the motor vehicle may be independent of a circadian value and/or may be independent of the time of day. The correction of the value characterizing the drowsiness of the driver in the motor vehicle may be independent of a circadian value and/or may be independent of the time of day.

According to example embodiments of the present invention, a model for determining the drowsiness or the attentiveness or degree of attentiveness, which is stored in a memory of a computing device in a vehicle, is connected to a sensor for determining the brightness of the vehicle surroundings, so that this information is included in the weighting of the model to determine the drowsiness. Moreover, further information, which comes from the driver and is detected by a sensor, is evaluated. This information may be an operation of a control element of the vehicle, such as a steering wheel, by the driver. Alternatively or additionally, a state of the driver is detected by a sensor such as a camera, for example, and is included in the drowsiness evaluation. For example, this activity or state may be determined as a function of the blinking of the eyelid, the pupil size, the pulse rate, etc.

For example, it is provided to accommodate the sensor for ascertaining brightness in the vehicle interior. An especially suitable location for this is the instrument cluster, e.g., in the area between the speedometer and the tachometer.

Furthermore, the acceleration and/or the speed of the vehicle may be included in the consideration when determining the drowsiness of the driver. In addition, a sensor may be used for measuring the temperature in the interior, which is included in the evaluation. Additionally, an outside temperature value may also be recorded and related to the inside temperature after a certain driving time. If it is cold in winter, and the interior temperature is reached after a driving time of 20 minutes, for example, it may be assumed that based on this temperature difference, the driver is more likely tired.

The light sensor for determining the brightness of the surroundings is dependent on the geographical location, for example. That is to say, in a country such as Sweden, the brightness over the day is not as strong as, for example, in a country such as Spain. This influence is taken into account in that the information from a GPS or Galileo system may be used and included in the evaluation, and thus may also be used when weighting the drowsiness.

Alternatively or additionally, the season may likewise be estimated based on the outside-temperature information. The position of the sun is dependent on the season, and in this manner, may be included in the consideration.

For example, the model includes at least one parameter that is vehicle-specific, e.g., the width, the length, the weight, etc., of the vehicle.

If drowsiness is detected, it may be provided to inform the driver about it via a display device such as, for example, in the instrument cluster, the navigation display, a monitor, etc. Furthermore, as an option, a signal is sounded additionally or alternatively to warn the driver.

Motor vehicles include, for example, a land vehicle that may be used individually in road traffic. However, motor vehicles should not be considered restricted to land vehicles having an internal combustion engine.

With the aid of example embodiments of the present invention, a drowsiness detection is achieved independently of the culture group of the driver. Thus, drivers from different culture groups may have different circadian rhythms, so that in the event a circadian rhythm for a culture group is used which does not correspond to the culture group of the driver, a false correction may come about. While German Published Patent Application No. 10 2009 004 487 emphasizes the importance of correcting the drowsiness detection as a function of the time of day, a drowsiness detection which takes no circadian rhythm into account, but rather uses the output signal of a brightness sensor, leads to results similar to a correction of the drowsiness detection dependent on circadian rhythm attuned to the culture group of the driver. Moreover, when using the drowsiness detection as described herein, no false correction occurs if the circadian rhythm and the culture group of the driver are not attuned to one another.

Further features and aspects of example embodiments of the present invention are described in more detail below with reference to the appended Figures.

DETAILED DESCRIPTION

Figure 1:
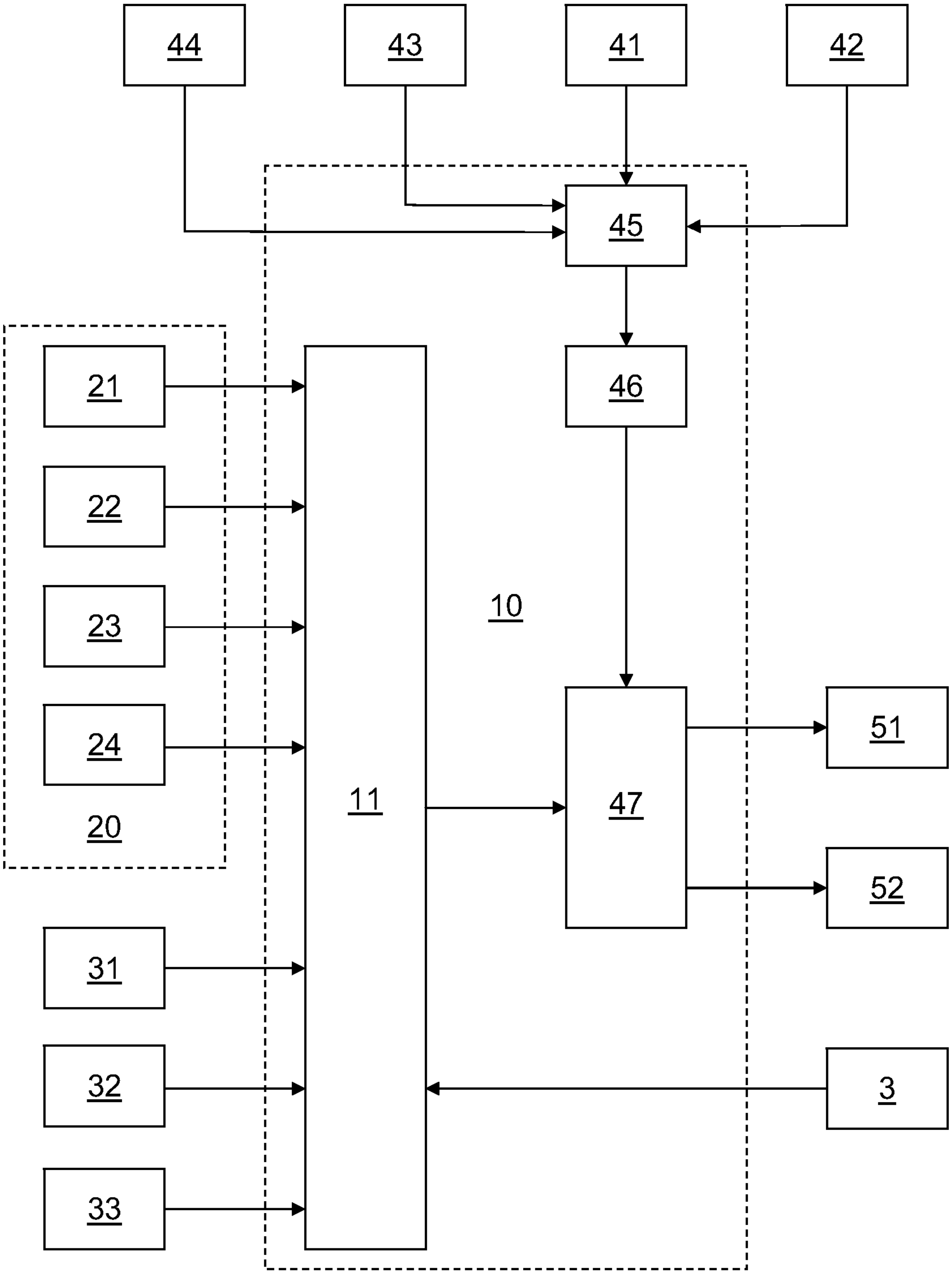
FIG. 1 schematically illustrates a device for detecting drowsiness according to an exemplary embodiment of the present invention.
Figure 2:
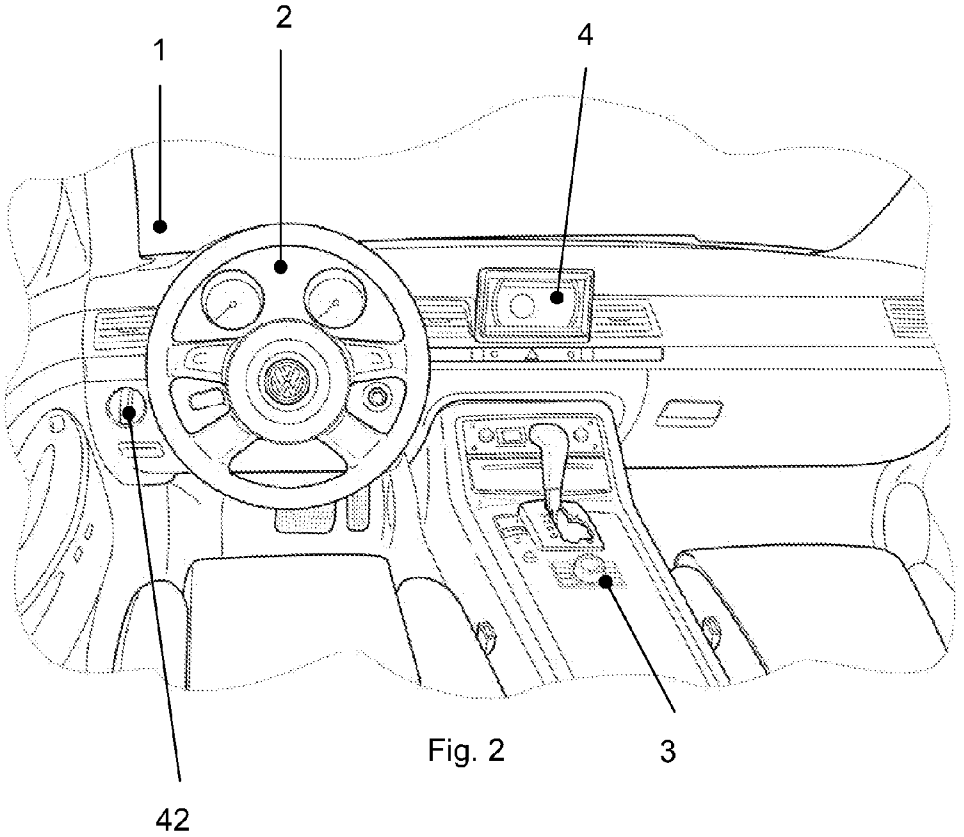
FIG. 2 is a perspective view of a passenger compartment of a motor vehicle having the drowsiness detection device illustrated in FIG. 1.
Figure 3:
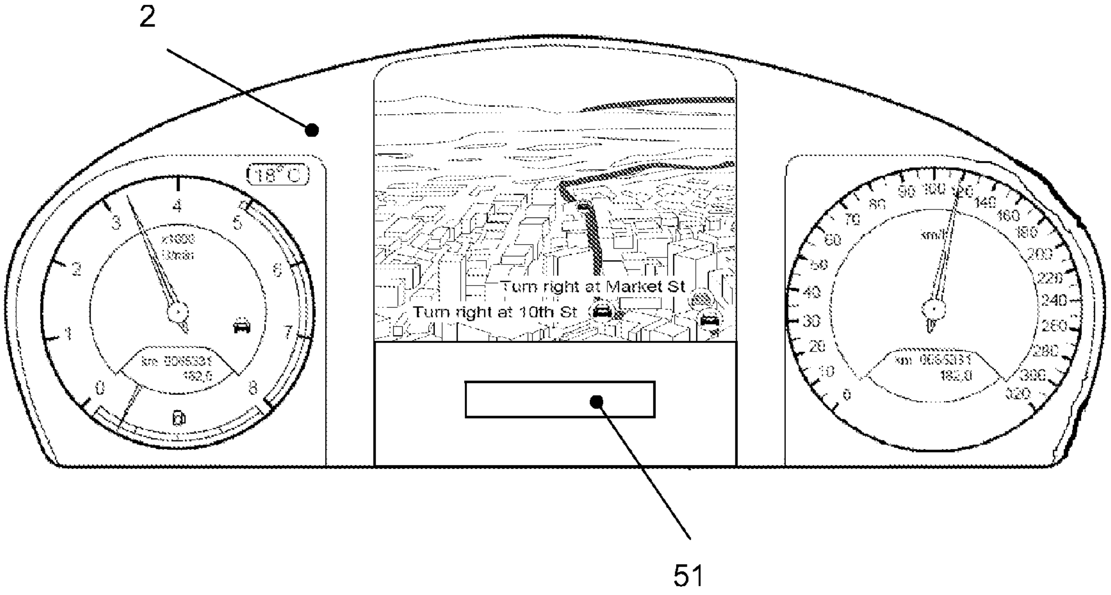
FIG. 3 illustrates an instrument cluster of the motor vehicle illustrated in FIG. 2.

FIG. 1 shows an exemplary embodiment of a device for detecting the drowsiness of a driver of a motor vehicle 1 shown in FIG. 2. The device for detecting drowsiness includes a drowsiness model 11 that evaluates the output quantities of a driver-activity sensor array 20. Driver-activity sensor array 20 includes a steering-angle sensor 21, a speed sensor 22, and an acceleration sensor 23. Sensors 21, 22, 23 may be arranged as independent sensors, or perhaps as part of an ESP system (vehicle stability control system). In addition, driver-activity sensor array 20 includes a camera 24 for picking up the roadway in front of motor vehicle 1. Drowsiness model 11 additionally evaluates the output quantity of a thermometer 31 for determining the outside temperature, a thermometer 32 for determining the inside temperature, as well as a device 33 (e.g., a camera) for detecting an eyelid movement of the driver.

Moreover, with the aid of an input device 3, especially in cooperation with a screen 4, manual inputs into drowsiness model 11 are possible that, for example, include information about the sleep history of the driver.

Figure 4:
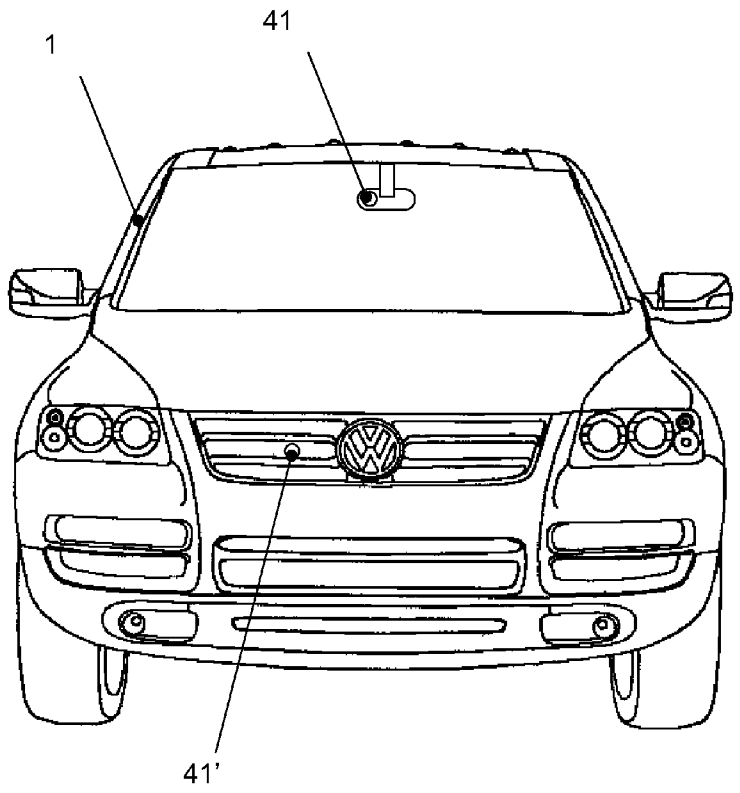
FIG. 4 is a front view of the motor vehicle illustrated in FIG. 1.

Drowsiness model 11, just like a correction module 47, is part of a drowsiness-detection module 10. With the aid of correction module 47, a value determined by drowsiness model 11 and characterizing the drowsiness of the driver in motor vehicle 1 is corrected as a function of an output quantity of a brightness sensor 41. Brightness sensor 41 may be provided on the rearview mirror of motor vehicle 1, as illustrated in FIG. 4. Alternatively or in addition to brightness sensor 41, a brightness sensor 41' may be provided on the radiator grille of motor vehicle 1, as illustrated in FIG. 4. It may also be provided to place a (e.g., transparent) brightness sensor on the windshield.

In certain configurations of drowsiness-detection module 10, a brightness-correction module 45 is provided that decreases or increases the output quantity of brightness sensor 41 as a function of the geographical location supplied by a position-finding system 44 and information as to the season supplied by a calendar 43. Likewise, the output quantity of brightness sensor 41 may be corrected as a function of the operating position of a switch 42 for adjusting the interior illumination.

In addition, drowsiness-detection module 10 may include a smoothing module 46 by which the output signal of brightness sensor 41 and of correction module 45, respectively, is smoothed. For example, to accomplish the smoothing, an integration or averaging may be carried out over a predetermined time window. Moreover, a "binarization" of the brightness value may be carried out, so that the output signal of smoothness module 46 assumes either the value "light" or the value "dark."

The value supplied by drowsiness model 11 and characterizing the drowsiness of the driver in motor vehicle 1 is corrected as a function of the output signal of smoothing module 46. In so doing, the value supplied by drowsiness model 11 and characterizing the drowsiness of the driver in motor vehicle 1 may be multiplied by the output value of smoothing module 46. However, it may also be provided that a limiting value, as of which drowsiness of a driver is assumed, is shifted as a function of the output value of smoothing module 46.

Correction module 47 controls a display 51 for indicating the drowsiness status of the driver. Moreover, with the aid of a loudspeaker 52, an acoustic warning signal may be output when drowsiness that exceeds a predetermined limiting value is detected.

What is claimed is:

1. A device for detecting drowsiness of a driver in a motor vehicle, comprising:
- a driver-activity sensor array;
- a brightness sensor adapted to determine brightness in surrounding of the motor vehicle;
- a drowsiness model adapted to determine a value characterizing the drowsiness of the driver as a function of at least one output quantity of the driver-activity sensor array and independent of at least one output of the brightness sensor; and
- a correction module adapted to correct the value characterizing the drowsiness of the driver as a function of the at least one output quantity of the brightness sensor and independent of the at least one output quantity of the driver-activity sensor array.

2. The device according to claim 1, wherein the driver-activity sensor array includes: a steering-angle sensor; a camera; a camera adapted to pick up a roadway in front of the motor vehicle; an acceleration sensor adapted to detect acceleration of the motor vehicle; and/or a speed sensor adapted to detect a speed of the motor vehicle.

3. The device according to claim 2, further comprising a unit adapted to detect an eyelid movement of the driver.

4. The device according to claim 1, further comprising a unit adapted to detect an eyelid movement of the driver.

5. The device according to claim 1, wherein the value characterizing the drowsiness of the driver is independent of a circadian value and/or is independent of a time of day.

6. The device according to claim 1, wherein the brightness sensor is arranged in a passenger compartment of the motor vehicle, on a rearview mirror of the motor vehicle, and/or in a radiator grille of the motor vehicle.

7. The device according to claim 1, wherein the correction module is adapted to correct the value characterizing the drowsiness of the driver by determining a correction value and at least one of (i) multiplying the value characterizing the drowsiness of the driver by the correction value; (ii) adding the correction value to the value characterizing the drowsiness of the driver; (iii) subtracting the correction value from the value characterizing the drowsiness of the driver; and/or (iv) limiting the value characterizing the drowsiness of the driver.

8. The device according to claim 1, wherein the correction module is adapted to correct the value characterizing the drowsiness of the driver by weighting the value characterizing the drowsiness of the driver as a function of the at least one output quantity of the brightness sensor.

9. The device according to claim 1, wherein the driver-activity sensor array includes at least one temperature sensor for sensing the temperature inside the vehicle and/or the temperature outside of the vehicle.

10. The device according to claim 1, further comprising a unit adapted to detect the geographical location of the vehicle, wherein the at least one output quantity of the brightness sensor is a dependent on the geographical location of the vehicle.

11. The device according to claim 1, further comprising:
- an interior illumination switch; and
- a unit adapted to detect an operating position of the interior illumination switch, wherein the at least one output quantity of the brightness sensor is a dependent on the operating position of the interior illumination switch.

12. The device according to claim 1, further comprising a unit adapted to detect the position of the sun, wherein the at least one output quantity of the brightness sensor is a dependent on the position of the sun.

13. The device according to claim 1, further comprising a display device adapted to display a visual warning in response to the value characterizing the drowsiness of the driver exceeding a predetermined limiting value.

14. The device according to claim 1, further comprising a speaker device adapted to provide an acoustic warning signal in response to the value characterizing the drowsiness of the driver exceeding a predetermined limiting value.

15. The device according to claim 1, further comprising an input device adapted to receive manual input of information relating to the driver's sleep history.

16. A device for detecting drowsiness of a driver in a motor vehicle, comprising:
- a driver-activity sensor array;
- a brightness sensor adapted to determine brightness in surroundings of the motor vehicle; and
- a drowsiness-detection module adapted to determine a value characterizing the drowsiness of the driver as a function of at least one output quantity of the driver-activity sensor array and as a function of at least one output quantity of the brightness sensor, wherein the function of at least one output quantity of the driver-activity sensor array is independent of at least one output quantity of the brightness sensor.

17. The device according to claim 16, wherein the driver-activity sensor array includes: a steering-angle sensor; a camera; a camera adapted to pick up a roadway in front of the motor vehicle; an acceleration sensor adapted to detect acceleration of the motor vehicle; a speed sensor adapted to detect a speed of the motor vehicle.

18. The device according to claim 17, further comprising a unit adapted to detect an eyelid movement of the driver.

19. The device according to claim 17, wherein the value characterizing the drowsiness of the driver is independent of a circadian value and/or independent of the time of day.

20. The device according to claim 16, further comprising a unit adapted to detect an eyelid movement of the driver.

21. The device according to claim 16, wherein the brightness sensor is arranged in a passenger compartment of the motor vehicle, on a rearview mirror of the motor vehicle, and/or in a radiator grille of the motor vehicle.

22. A method for detecting drowsiness of a driver in a motor vehicle, comprising:

determining at least one value characterizing an activity of the driver;

determining brightness in surroundings of the motor vehicle;

determining a value characterizing the drowsiness of the driver as a function of the value characterizing the activity of the driver and independent of the brightness in the motor-vehicle surroundings; and correcting the value characterizing the drowsiness of the driver as a function of the brightness in the motor-vehicle surroundings.

23. The method according to claim 22, wherein the value characterizing the activity of the driver includes a steering behavior of the driver.

24. The method according to claim 23, wherein the correction of the value characterizing the drowsiness of the driver is independent of a circadian value and/or independent of a time of day.

25. The method according to claim 22, wherein the determination of the value characterizing the drowsiness of the driver is independent of a circadian value and/or independent of a time of day.

26. The method according to claim 25, wherein the value characterizing the activity of the driver includes a steering behavior of the driver.

* * * * *